United States Patent
Takahashi et al.

(10) Patent No.: US 11,595,908 B2
(45) Date of Patent: Feb. 28, 2023

(54) USER EQUIPMENT AND BASE STATION APPARATUS

(71) Applicant: NTT DOCOMO, INC., Tokyo (JP)

(72) Inventors: Hideaki Takahashi, Tokyo (JP); Hiromasa Umeda, Tokyo (JP); Kei Andou, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 171 days.

(21) Appl. No.: 17/043,498

(22) PCT Filed: Apr. 5, 2018

(86) PCT No.: PCT/JP2018/014626
§ 371 (c)(1),
(2) Date: Sep. 29, 2020

(87) PCT Pub. No.: WO2019/193723
PCT Pub. Date: Oct. 10, 2019

(65) Prior Publication Data
US 2021/0022083 A1 Jan. 21, 2021

(51) Int. Cl.
*H04W 52/14* (2009.01)
*H04W 8/24* (2009.01)
*H04W 52/36* (2009.01)
*H04W 52/42* (2009.01)

(52) U.S. Cl.
CPC .......... *H04W 52/146* (2013.01); *H04W 8/24* (2013.01); *H04W 52/365* (2013.01); *H04W 52/367* (2013.01); *H04W 52/42* (2013.01)

(58) Field of Classification Search
CPC ............. H04W 52/146; H04W 52/365; H04W 52/367; H04W 52/42; H04W 8/24
See application file for complete search history.

(56) References Cited

U.S. PATENT DOCUMENTS

| | | | |
|---|---|---|---|
| 2011/0310781 A1* | 12/2011 | Kim | H04L 5/0046 370/328 |
| 2012/0176923 A1 | 7/2012 | Hsu et al. | |
| 2016/0119931 A1* | 4/2016 | Soriaga | H04W 72/0473 370/329 |

FOREIGN PATENT DOCUMENTS

| | | |
|---|---|---|
| JP | 2014-505416 A | 2/2014 |
| WO | 2006104348 A1 | 10/2006 |

(Continued)

OTHER PUBLICATIONS

Extended European Search Report issued in counterpart European Patent Application No. 18913564.3, dated Oct. 6, 2021 (11 pages).

(Continued)

*Primary Examiner* — Elton Williams
(74) *Attorney, Agent, or Firm* — Osha Bergman Watanabe & Burton LLP

(57) ABSTRACT

A terminal includes a transmitter that transmits, to a base station apparatus, UE capability including information indicating a supported frequency band and a power class at least defining spherical coverage in the frequency band; and a receiver that receives, from the base station apparatus, information on power control; wherein the transmitter further transmits, to the base station apparatus, an uplink transmission signal to which transmit power control based on at least one of the information on power control or the power class is applied.

4 Claims, 10 Drawing Sheets

(56) References Cited

FOREIGN PATENT DOCUMENTS

| WO | 2011119079 A1 | 9/2011 |
|----|---------------|--------|
| WO | 2012092851 A1 | 7/2012 |

OTHER PUBLICATIONS

LG Electronics; "EIRP level of UE power class at mmWave"; 3GPP TSG-RAN WG4 meeting #AH-1801, R4-1800513; San Diego, California, U.S.A.; Jan. 22-26, 2018 (3 pages).

Intel Corporation, Apple, Samsung; "On Spherical Coverage: EIRP CDF data for mm-Wave"; 3GPP TSG-RAN WG4 Meeting #84-Bis, R4-1710430; Dubrovnik, Croatia; Oct. 9-13, 2017 (4 pages).

Office Action issued in corresponding Australian Patent Application No. 2018417860 dated May 12, 2021 (3 pages).

International Search Report issued in Application No. PCT/JP2018/014626, dated Jun. 26, 2018 (5 pages).

Written Opinion issued in International Application No. PCT/JP2018/014626, dated Jun. 26, 2018 (4 pages).

3GPP TS 38.211 V15.0.0, Release 15; "3rd Generation Partnership Project; Technical Specification Group Radio Access Network; NR; Physical channels and modulation;" Dec. 2017; Sophia Antipolis Valbonne, France (149 pages).

3GPP TR 38.817-01 V1.0.0, Release 15; "3rd Generation Partnership Project; Technical Specification Group Radio Access Network; NR; General aspects for UE RF for NR;" Mar. 2018; Sophia Antipolis Valbonne, France (64 pages).

3GPP TSG-RAN WG4 Meeting 86; R4-1803279; "WF on UE feature list for CA/EN-DC, other capability and LTE-NR co-existence;" Intel Corporation; Feb. 26-Mar. 2, 2018; Athens, Greece (26 pages).

3GPP TSG-RAN WG4 Meeting #84; R4-1712931; "TP for UE RF TR 38.817-01: mmWave power class;" Sumitomo Electric; Nov. 27-Dec. 1, 2017; Reno, Nevada (4 pages).

3GPP TSG-RAN WG4 Meeting #85; R4-1712811 "CDF spherical coverage requirements for mmWave OTA" NTT Docomo, Inc.; Reno, USA; Nov. 27-Dec. 1, 2017 (2 pages).

3GPP TSG-RAN WG4 #84BIS meeting; R4-1710708 "Further evaluation on NR UE power class at mmWave" LG Electronics; Dubrovnik, Croatia; Oct. 9-13, 2017 (5 pages).

3GPP TSG-RAN WG4#82Bis; R4-1703044 "NR mmWave UE power class" Qualcomm Incorporated; Spokane, WA, USA; Apr. 3-7, 2017 (5 pages).

Office Action issued in Indian Application No. 202037047110; dated Sep. 10, 2021 (6 pages).

Office Action issued in Japanese Application No. 2020-512190; dated Sep. 21, 2021 (5 pages).

Office Action issued in Japanese Application No. 2020-512190; dated Apr. 19, 2022 (5 pages).

* cited by examiner

DIGITAL BEAMFORMING

ANALOG BEAMFORMING

Phase shifters

HYBRID BEAMFORMING

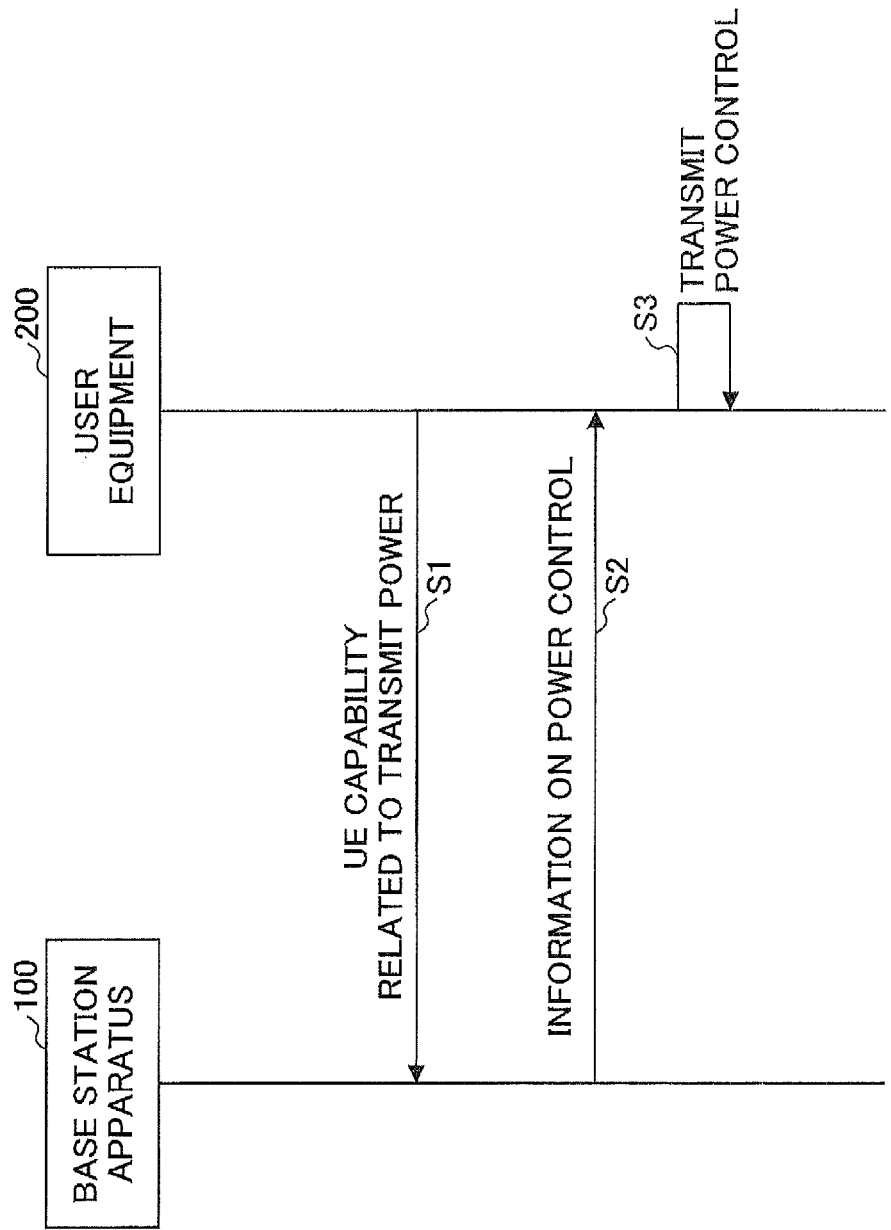

FIG.7

6.2.1 UE maximum output power

The following UE Power Classes define the maximum output power radiated by the UE for any transmission bandwidth within the channel bandwidth for non-CA configuration, unless otherwise stated. The period of measurement shall be at least one sub frame (1ms). The values listed on the table below are for handheld UE, defined as minimum peak EIRP, maximum allowed EIRP and TRP. The max allowed EIRP is derived from regulatory requirements [8].

Table 6.2.1-1: NR FR2 UE Power Class

| NR band | UE type | Power Class Min Peak EIRP (dBm) | Spherical coverage | | Maximum allowed EIRP (dBm) | Maximum allowed TRP (dBm) |
|---|---|---|---|---|---|---|
| | | | CDF percentile | EIRP at the % (dBm) | | |
| n257 | Handheld | [21.2-25.2] (default) | 20 | 18 | 43 | 23 |
| | | 26 | 20 | 21 | 43 | 26 |
| | FWA | 36 (default) | 95 | 35 | 55 | 26 |
| | | 26 | 95 | 25 | 43 | 23 |
| n258 | | [21.2-25.2] | | | | |
| n260 | | [19.4-23.7] | | | | |
| NOTE 1: | minimum peak EIRP is defined as the lower limit without tolerance | | | | | |

FIG.8

6.2.1 UE maximum output power

The following UE Power Classes define the maximum output power radiated by the UE for any transmission bandwidth within the channel bandwidth for non-CA configuration, unless otherwise stated. The period of measurement shall be at least one sub frame (1ms). The values listed on the table below are for handheld UE, defined as minimum peak EIRP, maximum allowed EIRP and TRP. The max allowed EIRP is derived from regulatory requirements [8].

Table 6.2.1-1: NR FR2 UE Power Class

| NR band | Power Class Min Peak EIRP (dBm) | Spherical class | Maximum allowed EIRP (dBm) | Maximum allowed TRP (dBm) |
|---|---|---|---|---|
| n257 | [21.2-25.2] | 1 | 43 | 23 |
| | 36.0 | 2 | 43 | 23 |
| n258 | [21.2-25.2] | 3 | 55 | 26 |
| n260 | [19.4-23.7] | | | |

NOTE 1: minimum peak EIRP is defined as the lower limit without tolerance

Table 6.2.1-2: NR FR2 Spherical Class

| Spherical Class | CDF percentile (%) | EIRP at the % (dBm) |
|---|---|---|
| 1 | 20 | 15 |
| 2 | 50 | 25 |
| 3 | 95 | 35 |

FIG.9

$P_{EMAX, MR-DC}$  Maximum allowed UE output power while the UE is configured with MR-DC signalled by higher layers. Same as IE *P-Max-MRDC*, defined in TS 38.331 [x].

The default power class $P_{PowerClass\_Default, EN-DC}$ for a DC configuration is Power Class 3 unless otherwise stated.

$$P_{CMAX\_L}(p,q) \leq P_{CMAX}(p,q) \leq P_{CMAX\_H}(p,q)$$

with $P_{CMAX\_L}(p,q) = \text{MIN} \{10 \log_{10} [p_{CMAX\_L,c,E\text{-}UTRA}(p) + p_{CMAX\_L,c,NR}(q)], P_{PowerClass, EN\text{-}DC}, P_{EMAX, EN-DC}\}$ $P_{CMAX\_H}(p,q) = \text{MIN} \{10 \log_{10} [p_{CMAX\_H,c,E\text{-}UTRA}(p) + p_{CMAX\_H,c,NR}(q)], P_{PowerClass, EN\text{-}DC} - \Delta P_{PowerClass, EN\text{-}DC}, P_{EMAX, EN-DC}\}$ where $p_{CMAX\_L,c,E\text{-}UTRA}(p)$, $p_{CMAX\_H,c,E\text{-}UTRA}(p)$, $p_{CMAX\_L,c,NR}(q)$, and $p_{CMAX\_H,c,NR}(q)$ are their respective high and low limits expressed in linear scale;

$P_{PowerClass, EN-DC}$ is defined in sub-clause 6.2.2.1 for intra-band EN-DC and 6.2.2.2 for inter-band EN-DC respectively;

For a power class higher than default UE power class capable UE, $\Delta P_{PowerClass, EN-DC} = P_{PowerClass, EN-DC} - P_{PowerClass\_Default, EN-DC}$ dB, when $P_{EMAX, EN-DC}$ is not indicated in the cell; or $P_{EMAX, EN-DC}$ is provided and set to the maximum output power of the default power class or lower, otherwise, $\Delta P_{PowerClass, EN-DC} = 0$ dB.

USER EQUIPMENT AND BASE STATION APPARATUS

TECHNICAL FIELD

The present invention relates to user equipment and a base station apparatus in a radio communication system.

BACKGROUND ART

In 3GPP (3rd Generation Partnership Project), the radio communication systems called 5G or NR (New Radio), (which are hereinafter referred to as 5G or NR), have been developed for achievement of larger system capacities, higher data transmission rates, and lower latency in a radio section, etc. For 5G, various radio communication technologies have been discussed in order to meet requirements in which latency in the radio section is 1 ms or less as well as achieving the throughput of 10 Gbps or more.

In NR, radio communications employing millimeter waves are considered and are assumed to cover a wide range of frequencies up to a higher frequency band than that in LTE. For the high frequency band, since propagation loss is particularly increased, beamforming with narrow beam width is applied in order to compensate such propagation loss (see, e.g., Non-Patent Document 1).

Prior Art Document

Non-Patent Document

Non-Patent Document 1: 3GPP TS 38.211 V15.0.0 (2017-12)

SUMMARY OF THE INVENTION

Problem to be Solved by the Invention

In the current situation of discussion on NR systems, power classes for indicating capability related to transmit power of user equipment are not clearly defined according to frequency bands used or dual connectivity (hereafter, which is also referred to as "DC"). For this reason, when user equipment performs transmission in the NR systems, transmit power control as desired may face difficulties.

In view of the point described above, an object of the present invention is directed to user equipment that properly performs transmit power control in a wireless communication system.

Means for Solving the Problem

According to disclosed techniques, user equipment is provided: having a controlling unit that determines UE capability related to transmit power, the UE capability including information indicating a power class and spherical coverage; a notification unit that transmits the determined UE capability to a base station apparatus; a receiving unit that receives, from the base station apparatus, information on power control based on the transmitted UE capability; and a transmitting unit that transmits an uplink transmission signal, to which transmit power control based on the information on power control is applied, to the base station apparatus.

Advantage of the Invention

According to the disclosed techniques, the user equipment is capable of properly performing transmit power control in a radio communication system.

BRIEF DESCRIPTION OF DRAWINGS

FIG. 6 is a sequence diagram for explaining a UE capability report procedure according to the embodiment of the present invention;

FIG. 7 is a diagram illustrating a changed specification example (1) according to the embodiment of the present invention;

FIG. 8 is a diagram illustrating a changed specification example (2) according to the embodiment of the present invention;

FIG. 9 is a diagram illustrating a changed specification example (3) according to the embodiment of the present invention;

EMBODIMENTS OF THE INVENTION

Figure 1:
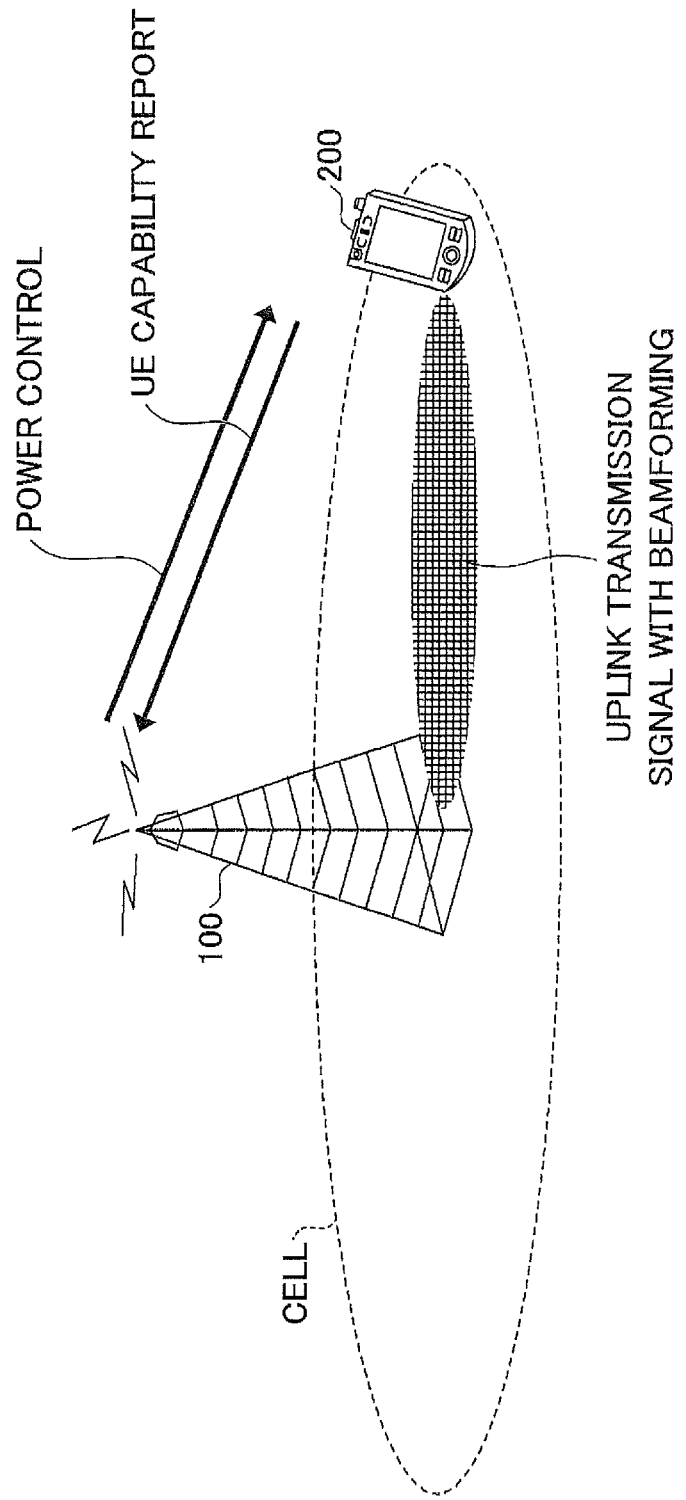
FIG. 1 is a diagram illustrating a configuration example of a radio communication system according to an embodiment of the present invention.

In the following, embodiments of the present invention are described with reference to the drawings. It is noted that the embodiments described below are merely an example, and embodiments for which the present invention applies is not limited to the embodiments below.

In operating a radio communication system according to the embodiment of the present invention, existing techniques are used as appropriate. The existing techniques contain, for example, existing LTE, but are not limited thereto. The term "LTE" used in the specification broadly means LTE-Advanced, and systems (e.g., NR or 5G) used after LTE-Advanced, unless otherwise stated.

In the embodiments of the present invention described below, the terms used in the existing LTE, such as SS (Synchronization Signal), PSS (Primary SS), SSS (Secondary SS), PBCH (Physical broadcast channel), PRACH (Physical RACH), are used for ease of description. However, similar signals, functions and so forth to these terms may be referred to by other terms.

In the embodiment of the present embodiment, a duplex system may be TDD (Time Division Duplex) system, FDD (Frequency Division Duplex) system, or other systems (e.g., Frequency Duplex, etc.).

Furthermore, in the following description, in transmitting a signal by using a transmission beam, a signal multiplied by a pre-coding vector (pre-coded with pre-coding vector) may be transmitted. Similarly, in receiving a signal by using a reception beam, the signal may be multiplied by a predetermined weight vector. Further, in transmitting a signal by using a transmission beam, the signal may be transmitted from a specific antenna port. Similarly, in receiving a signal by using a reception beam, the signal may be received from a specific antenna port. The antenna port is referred to as a logical antenna port or a physical antenna port, which is defined by 3GPP standard.

It is noted that a method of forming the transmission beam or the reception beam is not limited to the above method. For example, in the base station apparatus 100 or the user equipment 200, each of which is provided with a plurality of antennas, a method of changing the respective antenna angles may be implemented, or a method of combining a method of using a pre-coding vector with the method of changing the antenna angles may be implemented. Alternatively, switching different antenna panels may be implemented, a method of using a combination of multiple antenna panels may be implemented, or alternatively, other methods may be implemented. Also, for example, in a high-frequency band, multiple transmission beams that are different from each other may be used. Using the multiple transmission beams is referred to as multi-beam-operation, and using a single transmission beam is referred to as single-beam-operation.

In the embodiment of the present invention, in "configuring" a radio parameter or so forth, a predetermined value may be pre-configured or be defined, or alternatively, a radio parameter notified by the base station apparatus 100 or the user equipment 200 may be configured.

FIG. 1 is a diagram illustrating a configuration example of a wireless communication system according to an embodiment of the present invention. The wireless communication system according to the embodiment of the present invention includes a base station apparatus 100 and user equipment 200 as illustrated in FIG. 1. In FIG. 1, the base station apparatus 100 and the user equipment 200 are represented singly. However, this is an example, and they may be multiple.

The base station apparatus 100 provides one or more cells and is a communication apparatus that wirelessly communicates with the user equipment 200. As illustrated in FIG. 1, the base station apparatus 100 transmits information on power control of the user equipment 200 to the user equipment 200. The information on power control is a TPC (Transmission Power Control) command transmitted based on DCI (Downlink Control Information), for example. The TPC command allows an absolute value or a cumulative value of PUSCH (Physical Uplink Shared Channel) transmit power to be indicated to the user equipment 200.

As illustrated in FIG. 1, the user equipment 200 transmits a UE capability report to the base station apparatus 100. The UE capability report includes a power class (PC) of a transmit power, for example. The user equipment 200 reports which power class is applied to the user equipment to the base station apparatus 100. Also, as illustrated in FIG. 1, the user equipment 200 transmits an uplink transmission signal with beamforming to which transmit power control is applied according to the power class to the base station apparatus 100.

Figure 2:
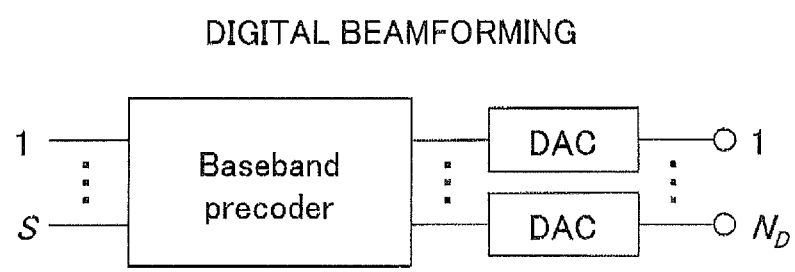
FIG. 2 is a diagram illustrating a configuration example of a circuit for performing digital beamforming.

FIG. 2 is a diagram illustrating a configuration example of a circuit for performing digital beamforming. For a manner of implementing beamforming, as illustrated in FIG. 2, digital beamforming is considered in such a way that includes a same number of DACs (Digital Analog converters) as transmit antenna elements, as well as performing baseband signal processing of precoding the same number of times as the number of transmit antenna elements.

Figure 3:
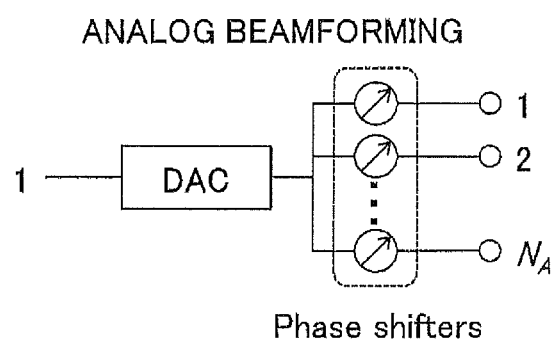
FIG. 3 is a diagram illustrating a configuration example of a circuit for performing analog beamforming.

FIG. 3 is a diagram illustrating a configuration example of a circuit for performing analog beamforming. For a manner of implementing the analog beamforming, as illustrated in FIG. 3, analog beamforming is considered in such a way that implements beamforming with use of variable phase shifters of an RF (Radio Frequency) circuit at a stage after transmission signals are converted into analog signals via the DAC.

Figure 4:
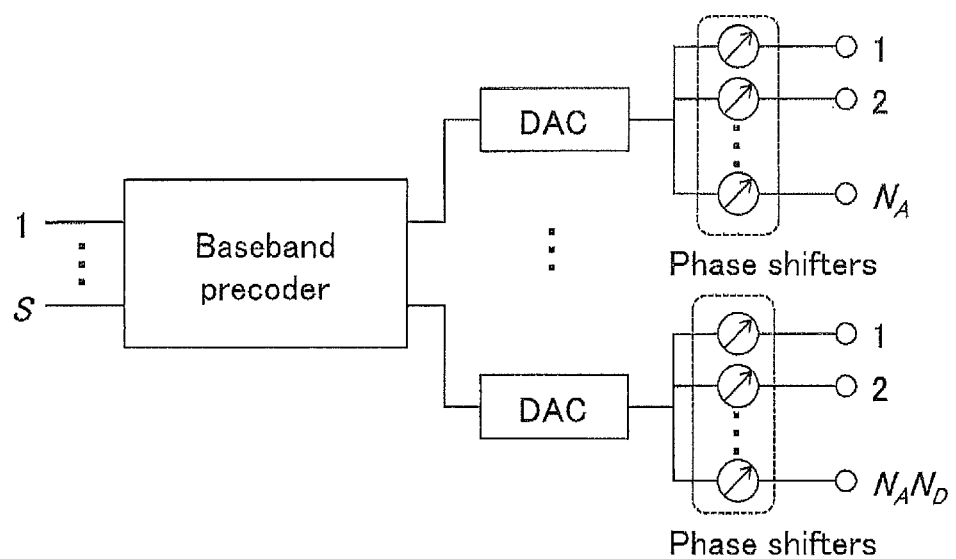
FIG. 4 is a diagram illustrating a configuration example of a circuit for performing hybrid beamforming.

FIG. 4 is a diagram illustrating a configuration example of a circuit for performing hybrid beamforming. As illustrated in FIG. 4, hybrid beamforming is considered in such a way that implements beamforming processing with use of both of baseband signal processing of precoding, and variable phase shifters of an RF circuit by combining digital beamforming with analog beamforming.

Figure 5:
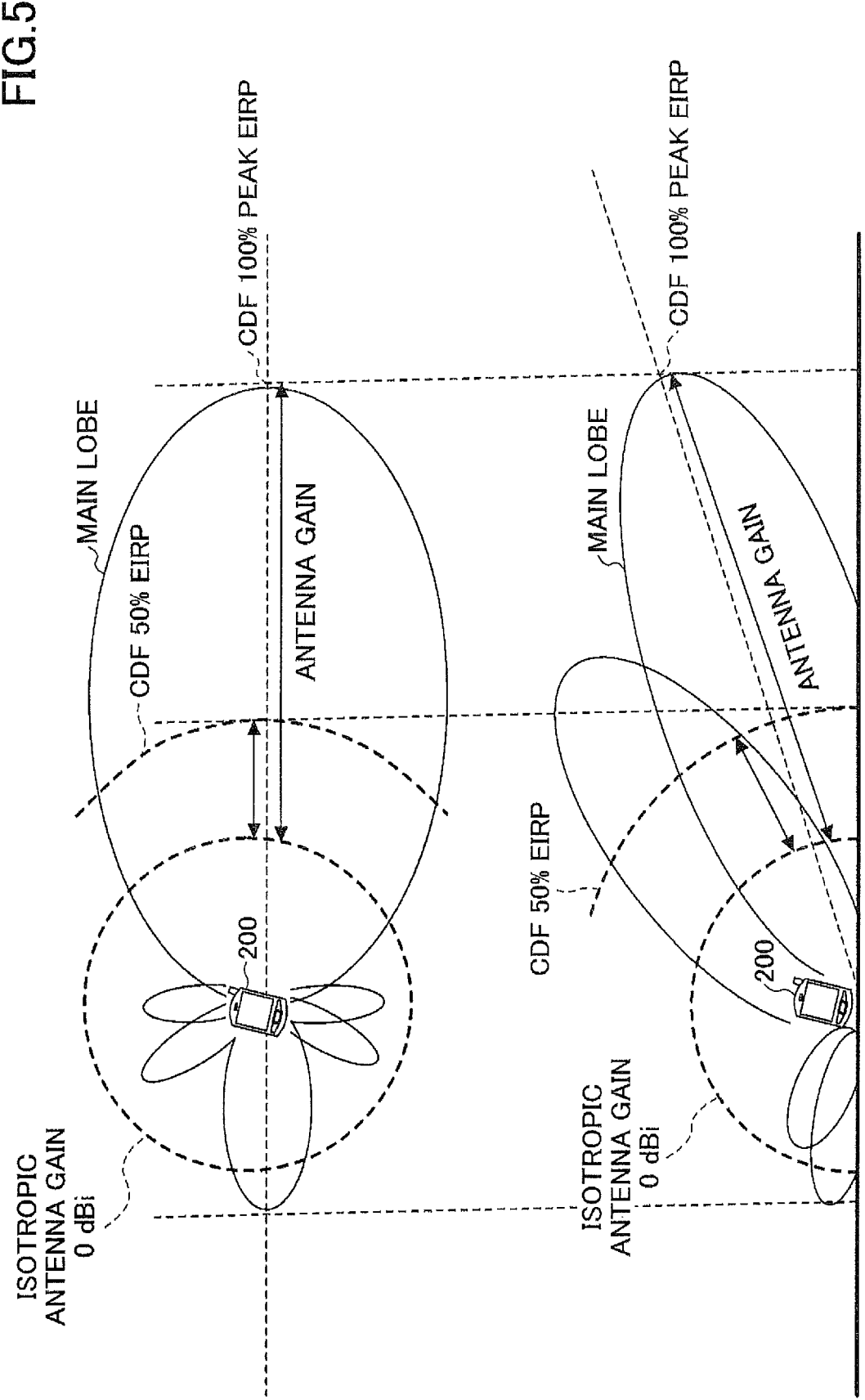
FIG. 5 is a diagram for explaining EIRP and CDF during beamforming.

FIG. 5 is a diagram for explaining EIRP and CDF during beamforming according to the embodiment of the present invention. FIG. 5 schematically illustrates antenna characteristics during beamforming by the user equipment 200. As illustrated in FIG. 5, the antenna characteristics during beamforming by the user equipment 200 have directivity.

The upper diagram of FIG. 5 illustrates the antenna characteristics in a horizontal plane in which a main lobe having maximum radiation, and other sub lobes are shown. As illustrated in FIG. 5, since the antenna has directivity, gain greatly changes depending on a radiation angle. Antenna gain of a directional antenna of the user equipment 200 is obtained from points between a dotted line representing isotropic antenna gain 0 dBi and the maximum radiation of the main lobe.

The lower diagram of FIG. 5 illustrates the antenna characteristics in a vertical plane in which a main lobe having maximum radiation, and other sub lobes are shown. Since the user equipment 200 is assumed to be on the ground, the vertical plane with a hemisphere is shown. However, power is spherically radiated in practice.

Here, a definition of CDF (Cumulative Distribution Function) with respect to EIRP (Equivalent Isotropic Radiated Power) is described as an example. For power spherically radiated via the antenna, it is measured at multiple spherical test points that are disposed three-dimensionally. CDF is obtained from plots represented as cumulative distribution with a ratio of EIRP achievable at each test point.

As illustrated in FIG. 5, the maximum radiation of the main lobe of the antenna of the user equipment 200 corresponds to peak EIRP. That is, CDF is 100% in a direction in which the antenna of the user equipment 200 enables a maximum antenna gain. Thus, peak EIRP is achieved. In this case, an antenna gain is obtained from a distance between a dotted line representing isotropic antenna gain 0 dBi and a peak end of the main lobe. For example, in a case where a transmit power is 20 dBm at a connector end of the antenna, and peak EIRP is 30 dBm, the antenna gain is 10 dBm when the peak EIRP is obtained. In a case where the user equipment 200 does not achieve peak EIRP, i.e., if the user equipment 200 does not perform transmission toward a bore site of the antenna, the antenna gain is decreased to 7 dB, etc., for example.

In terms of the antenna of the user equipment 200 as illustrated in FIG. 5, EIRP with respect to CDF of 50% is represented by a broken line for indicating "CDF 50% EIRP". In this case, an antenna gain is obtained from a distance between the dotted line representing the isotropic antenna gain 0 dBi and a position where EIRP with respect to CDF of 50% is achieved. For example, in a case where a transmit power is 20 dBm at a connector end of the antenna, and EIRP with respect to CDF of 50% is 24 dBm, the antenna gain is 4 dBm.

FIG. 6 is a sequence diagram for explaining a UE capability report procedure according to the embodiment of the present invention. In step S1, the user equipment 200 transmits UE capability related to transmit power to the base station apparatus 100. The UE capability related to transmit power includes information indicating a power class and spherical coverage. The spherical coverage refers to a spherical area defined with EIRP or CDF as described in FIG. 5.

In NR, for power classes included in a UE capability notification, the following four are considered.
1) FR1 UE power class
2) FR2 UE power class
3) FR1 UE power class for EN-DC
4) FR1 UE power class for NR CA The above FR (Frequency Range) refers to a frequency band. For example, FR1 ranges from 450 MHz to 6000 MHz, and FR2 ranges from 24250 MHz to 52600 MHz. The above frequencies are merely examples, and these frequencies defined by the frequency band may be changed.

1) above: FR1 UE power class has a feature related to RF characteristics and is a power class defined on a per band basis. 2) above: FR2 UE power class has a feature related to RF characteristics and is a power class defined on a per band basis.

3) above: FR1 UE power class for EN-DC has a feature related to RF characteristics and base band processing, and is a power class defined on a per-band-combination basis. EN-DC refers to dual connectivity for communicating in both E-UTRA (Evolved Universal Terrestrial Radio Access) and NR.

4) above: FR2 UE power class for NR CA has a feature related to RF characteristics and base band processing, and is a power class defined on a per-band-combination basis. NR CA refers to carrier aggregation (CA) in NR.

For example, a power class for EN-DC may be defined based on LTE power class(es) and NR power class(es). The largest power class among the LTE power class(es) and the NR power class(es) may be defined as the power class for EN-DC. Also, for example, the power class for EN-DC may be defined with a sum of the LTE power class and the NR power class.

The power class for EN-DC may be defined according to an implementation of a power amplifier and an RF circuit of the user equipment 200. For example, when the power amplifier and the RF circuit are shared in LTE and NR, the largest power class among the LTE power class(es) and the NR power class(es) may be defined as the power class for EN-DC. Also, for example, when the power amplifier and the RF circuit are configured, separately in each of LTE and NR, the power class for EN-DC may be defined with a sum of the LTE power class and the NR power class.

NR power class in FR1 may be defined as with the case of LTE. That is, default power class is defined on a per band basis. The default power class is a certain power class predetermined. When the user equipment 200 applies to only the default power class, UE capability signaling does not include the default power class and includes a corresponding frequency band only. Only in a case where the user equipment 200 applies to the default power class as well as another power class, another power class is included in the UE capability signaling.

NR power class in FR2 may be changed according to use application or characteristics of the user equipment 200, without defining default power class for each band. However, the power class in FR2 defined is not discussed in detail. In addition, the power class for NR CA or EN-DC defined is not discussed in detail. Particularly, for P_MAX indicating a maximum transmit power defined per cell, if P_CMAX indicating a maximum transmit power of each RAT (Radio Access Technology) is controlled to be equal to or less than the power class, P_CMAX for EN-DC is not defined.

Hereafter, a first report procedure for UE capability is described. As an example, Table 1 defines, for each of terminal types, default power class and spherical coverage as well as additional power class and spherical coverage, with respect to each NR frequency band in FR2.

TABLE 1

| Band number | UE types | Default PC/ Spherical coverage | Additional PC/ Spherical coverage |
|---|---|---|---|
| n256 | Mobile | 23 dBm/ 20 dBm@20% tile | Not supported |
| n256 | Fixed | 26 dBm/ 23 dBm@95% tile | 30 dBm/ 27 dBm@95% tile |
| n257 | Mobile | 23 dBm/ 20 dBm@20% tile | 26 dBm/ 23 dBm@20% tile |
| n257 | Fixed | 30 dBm/ 27 dBm@95% tile | 33 dBm/ 30 dBm@95% tile |

"Band number" shown in Table 1 identifies each band. The terminal type "UE types" includes "Mobile" for indicating portable user equipment 200, and "Fixed" for indicating fixed user equipment 200. The user equipment 200 reports "Band number" corresponding to an available band, and "UE types", which are included in the UE capability, to the base station apparatus 100.

"Default PC/Spherical coverage" shown in Table 1 indicates default power class and spherical coverage, and is preliminarily defined with respect to each band and terminal type. "Default PC/Spherical coverage" is not required to be reported as the UE capability by the user equipment 200 to the base station apparatus 100. "Additional PC/Spherical coverage" shown in Table 1 indicates additional power class and spherical coverage other than the default power class and spherical coverage. "Additional PC/Spherical coverage" is reported as the UE capability by the user equipment 200 to the base station apparatus 100.

For a first example shown in Table 1, in a case where "Band number" indicates "n256", and "UE types" indicates "Mobile", the default power class is "23 dBm", and the spherical coverage indicates EIRP of 20 dBm and CDF of 20%. The additional power class and spherical coverage are not supported. Note that the spherical coverage corresponding to the default power class may indicate EIRP ranging from 20 dBm to 23 dBm and CDF of 20%.

For a second example shown in Table 1, in a case where "Band number" indicates "n256", and "UE types" indicates "Fixed", the default power class is "26 dBm", the spherical coverage indicates EIRP of 23 dBm and CDF of 95%, the additional power class is "30 dBm", and the spherical coverage indicates EIRP of 27 dBm and CDF of 95%. Note that the spherical coverage corresponding to the default power class may indicate EIRP ranging from 23 dBm to 26 dBm and CDF of 95%. Alternatively, the spherical coverage corresponding to the default power class may indicate EIRP ranging from 27 dBm to 30 dBm and CDF of 95%.

For a third example shown in Table 1, in a case where "Band number" indicates "n257", and "UE types" indicates "Mobile", the default power class is "23 dBm", the spherical coverage indicates EIRP of 20 dBm and CDF of 20%, the additional power class is "26 dBm", and the spherical coverage indicates EIRP of 23 dBm and CDF of 20%. Note that the spherical coverage corresponding to the default power class may indicate EIRP ranging from 20 dBm to 23 dBm and CDF of 20%. Alternatively, the spherical coverage corresponding to the additional power class may indicate EIRP ranging from 23 dBm to 26 dBm and CDF of 20%.

For a fourth example shown in Table 1, in a case where "Band number" indicates "n257", and "UE types" indicates "Mobile", the default power class is "30 dBm", the spherical coverage indicates EIRP of 27 dBm and CDF of 95%, the additional power class is "33 dBm", and the spherical coverage indicates EIRP of 30 dBm and CDF of 95%. Note that the spherical coverage corresponding to the default power class may indicate EIRP ranging from 27 dBm to 30 dBm and CDF of 95%. Alternatively, the spherical coverage corresponding to the additional power class may indicate EIRP ranging from 30 dBm to 33 dBm and CDF of 95%.

Hereafter, a second report procedure for the UE capability is described. For the second report procedure, when the user equipment 200 applies to only default power class, UE capability signaling does not include the default power class and includes a corresponding frequency band only.

Only in a case where the user equipment 200 applies to the default power class as well as another power class, another power class is included in the UE capability signaling. In addition, with respect to each NR frequency band in FR2, spherical coverage class as shown in Table 2 is defined for each power class. In this case, the user equipment 200 includes the spherical coverage class in the UE capability signaling. The spherical coverage class defined may be common to multiple power classes, or be independent of the power class.

TABLE 2

| Spherical coverage class | EIRP [dBm] | CDF [%] |
|---|---|---|
| 1 | 20 | 20 |
| 2 | 30 | 50 |
| 3 | 40 | 95 |

As shown in Table 2, the spherical coverage class "Spherical coverage class" is defined with EIRP and CDF. In a first example shown in Table 2, the spherical coverage class "1" is defined with EIRP of 20 dBm and CDF of 20%. In a second example shown in Table 2, the spherical coverage class "2" is defined with EIRP of 30 dBm and CDF of 50%. In a third example shown in Table 2, the spherical coverage class "3" is defined with EIRP of 40 dBm and CDF of 95%.

The user equipment 200 reports UE capability, including a band number of a supported frequency as well as the spherical coverage class corresponding to the default power class, to the base station apparatus 100. If the spherical coverage class defined is common to multiple power classes or is independent of the power class, the spherical coverage class may be reported as the UE capability to the base station apparatus 100, independently of the power class.

When the user equipment 200 supports a band number of a supported frequency as well as a power class other than the default power class, the user equipment 200 reports UE capability, including the spherical coverage class corresponding to the supported power class, to the base station apparatus 100. If the spherical coverage class defined is common to multiple power classes or is independent of the power class, the spherical coverage class may be reported as the UE capability to the base station apparatus 100, independently of the power class other than the default power class.

It is noted that the spherical coverage class may be defined with EIRP and CDF as shown in Table 2. Alternatively, the spherical coverage class may be defined with EIRP only, or be defined with CDF only.

Table 3 shows another example of defining the spherical coverage class.

TABLE 3

| Spherical coverage class | EIRP [dBm] | CDF [%] |
|---|---|---|
| 1 | 20 | 20 or more to less than 50 |
| 2 | 20 | 50 or more |
| 3 | 30 | 50 or more |
| 4 | 40 | 95 or more |

As shown in Table 3, the spherical coverage class may be defined with EIRP and a predetermined range of CDF. In a first example shown in Table 3, the spherical coverage class "1" is defined with EIRP of 20 dBm and CDF ranging from 20% or more to less than 50%. In a second example shown in Table 3, the spherical coverage class "2" is defined with EIRP of 20 dBm and CDF of 50% or more. In a third example shown in Table 3, the spherical coverage class "3" is defined with EIRP of 30 dBm and CDF of 50% or more. In a fourth example shown in Table 3, the spherical coverage class "4" is defined with EIRP of 40 dBm and CDF of 95% or more.

Table 4 shows another example of defining the spherical coverage class.

TABLE 4

| Spherical coverage class | EIRP [dBm] | CDF [%] |
|---|---|---|
| 1 | 20 or more | 20 |
| 2 | 20 or more | 50 |
| 3 | 30 or more | 50 |
| 4 | 40 or more | 95 |

As shown in Table 4, the spherical coverage class may be defined with a predetermined range of EIRP, and CDF. In a first example shown in Table 4, the spherical coverage class "1" is defined with EIRP of 20 dBm or more and CDF of 20%. In a second example shown in Table 3, the spherical coverage class "2" is defined with EIRP of 20 dBm or more and CDF of 50%. In a third example shown in Table 3, the spherical coverage class "3" is defined with EIRP of 30 dBm or more and CDF of 50%. In a fourth example shown in Table 3, the spherical coverage class "4" is defined with EIRP of 40 dBm or more and CDF of 95%.

Hereafter, a definition of the power class for NR CA is described. Aside from a case where CA is not applicable, the power class for NR CA may be defined on a per-NR CA band-combination basis. When the user equipment 200 applies to only default power class, UE capability signaling does not include a corresponding power class and includes a corresponding band combination only. Only in a case where the user equipment 200 applies to the default power class as well as another power class, another power class, which is included in the UE capability signaling, is reported to the base station apparatus 100. It is noted that, in NR CA, both of a frequency band covered in FR1 and a frequency band covered in FR2 may be employed.

Hereafter, a definition of the power class for EN-DC is described. As with the case of the power class for NR CA described above, with respect to the power class for EN-DC, default power class may be defined on a per EN-DC band combination basis.

When the user equipment 200 applies to only the default power class, UE capability signaling does not include the default power class and includes a corresponding band combination only. Only in a case where the user equipment 200 applies to the default power class as well as another power class, another power class, which is included in the UE capability signaling, is reported to the base station apparatus 100.

It is noted that CA may be applied in NR for the EN-DC band combination. The following items 1) to 5) are examples of the definition of the power class for the EN-DC band combination. Transmit power control as desired can be performed by defining the power classes, as given in 1) to 5) below.

1) For each EN-DC band combination, the power class of the EN-DC band combination may be defined by adding a power class of LTE frequency band to a sum of power classes of the NR CA band combination.
2) For each EN-DC band combination, the larger of the power class of LTE frequency band or a sum of power classes of NR CA band combination may be defined as the power class of the EN-DC band combination.
3) For each EN-DC band combination, the smaller of a power class of LTE frequency band or power classes of NR CA band combination may be defined as the power class of the EN-DC band combination.
4) For each EN-DC band combination, the largest power class among a power class of LTE frequency band and each power class of NR CA band combination may be defined as the power class of the EN-DC band combination.
5) For each EN-DC band combination, the smallest power class among a power class of LTE frequency band or each power class of NR CA band combination may be defined as the power class of the EN-DC band combination.

It is noted that, for each EN-DC band combination, the base station apparatus 100 may indicate which power class of the EN-DC band combination defined by any of 1) to 5) above is employed to the user equipment 200.

Hereafter, a definition of a maximum transmit power value P_CMAX for EN-DC is described. P_CMAX in LTE or NR may be calculated as follows.

P_CMAX(LTE)=MIN(PowerClass_LTE,P_MAX (LTE))

P_CMAX(NR)=MIN(PowerClass_NR,P_MAX(NR))

In addition, for EN-DC, a maximum transmit power allowed in a total group of cells of an MCG (Master Cell Group) and an SCG (Secondary Cell Group) is newly defined as P_MAX(EN-DC). P_MAX(EN-DC) may be individually indicated to the user equipment 200 via RRC (Radio Resource Control) signaling.

P_CMAX(EN-DC) for EN-DC may be calculated using P_MAX(EN-DC) as follows.

P_CMAX(EN-DC)=MIN{[P_CMAX(LTE)+P_C-MAX(NR)]},P_MAX(EN-DC),PowerClass(EN-DC)]}

In step S2, the base station apparatus 100 transmits information on power control to the user equipment 200 based on the UE capability related to transmit power received in step S1. The information on power control includes, for example, a TPC command, a parameter(s) for determining the maximum transmit power, and the like. In step S3, the user equipment 200 performs transmit power control based on the information on power control received in step S2. For example, the user equipment 200 may obtain P_MAX from the received information on power control to calculate P_CMAX. Alternatively, the user equipment 200 may obtain the TPC command from the received information on power control to perform transmit power control.

FIG. 7 is a diagram illustrating a changed specification example (1) according to the embodiment of the present invention. With reference to FIG. 7, explanation will be provided for a new definition of the power class. As illustrated in FIG. 7, as an example, spherical coverage is defined with "UE type" indicating a terminal type, and "Power Class Min Peak EIRP" for indicating a power class defined with minimum peak EIRP. It is noted that, as with the case of Table 1, when the user equipment 200 applies to only default power class, the default power class is not required to be included in UE capability signaling.

For a first example illustrated in FIG. 7, in a case where "NR band" identifying each band is "n257", and "UE type" is "Handheld", "Power Class Min Peak EIRP" for indicating a power class defined with the minimum peak EIRP, indicates "[21.2-25.2]", and corresponding spherical coverage indicates CDF of 20% and EIRP of 18 dBm. It is noted that the "Power Class Min Peak EIRP" indicates default power class, where maximum allowed EIRP is 43 dBm, and maximum transmit power is 23 dBm.

For a second example illustrated in FIG. 7, in a case where "NR band" identifying each band is "n257", and "UE type" is "Handheld", "Power Class Min Peak EIRP" for indicating a power class defined with the minimum peak EIRP is "26", and corresponding spherical coverage indicates CDF of 20% and EIRP of 21 dBm. It is noted that maximum allowed EIRP is 43 dBm, and maximum transmit power is 26 dBm.

For a third example illustrated in FIG. 7, in a case where "NR band" identifying each band is "n257", and "UE type" is "FWA (Fixed wireless access)", "Power Class Min Peak EIRP" for indicating a power class defined with the minimum peak EIRP is "36", and corresponding spherical coverage indicates CDF of 95% and EIRP of 35 dBm. It is noted that the "Power Class Min Peak EIRP" indicates default power class, where maximum allowed EIRP is 55 dBm, and maximum transmit power is 26 dBm.

For a fourth example illustrated in FIG. 7, in a case where "NR Band" indicating each band is "n257", and "UE types" is "FWA", "Power Class Min Peak EIRP" for indicating the power class defined with the minimum peak EIRP is "26", and corresponding spherical coverage indicates CDF of 95% and EIRP of 25 dBm. It is noted that maximum allowed EIRP is 43 dBm, and maximum transmit power is 23 dBm.

FIG. 8 is a diagram illustrating a changed specification example (2) according to the embodiment of the present invention. With reference to FIG. 8, as an example, explanation will be provided for a new definition of the power class. As illustrated in FIG. 8, an example provides a case where spherical coverage class is defined with "UE type" indicating a terminal type, and "Power Class Min Peak EIRP" for indicating a power class defined with minimum peak EIRP, and further, spherical coverage corresponding to the spherical coverage class is defined. It is noted that, as with the case of Table 1, when the user equipment 200 applies to only default power class, the default power class is not required to be included in UE capability signaling.

For a first example shown in "NR FR2 UE Power Class" of FIG. 8, in a case where "NR band" identifying each band is "n257", "Power Class Min Peak EIRP" for indicating a power class defined with the minimum peak EIRP, indicates "[21.2-5.2]", and corresponding spherical coverage is "1". It is noted that maximum allowed EIRP is 43 dBm, and maximum transmit power is 23 dBm.

For a second example shown in "NR FR2 UE Power Class" of FIG. 8, in a case where "NR band" identifying each band is "n257", "Power Class Min Peak EIRP" for indicating a power class defined with the minimum peak EIRP is "36.0", and corresponding spherical coverage is "2". It is noted that maximum allowed EIRP is 43 dBm, and maximum transmit power is 23 dBm.

For a third example shown in "NR FR2 UE Power Class" of FIG. 8, in a case where "NR band" identifying each band is "n257", "Power Class Min Peak EIRP" for indicating a power class defined with the minimum peak EIRP is "36.0", and corresponding spherical coverage is "3". It is noted that maximum allowed EIRP is 55 dBm, and maximum transmit power is 26 dBm.

For "NR FR2 UE Spherical Class" of FIG. 8, the spherical coverage class "1" corresponds to CDF of 20% and EIRP of 15 dBm, with respect to spherical coverage. Also, the spherical coverage class "2" corresponds to coverage CDF of 50% and EIRP of 25 dBm, with respect to spherical coverage. The spherical coverage class "3" corresponds to spherical coverage CDF of 95% and EIRP of 35 dBm, with respect to spherical coverage.

FIG. 9 is a diagram illustrating a changed specification example (3) according to the embodiment of the present invention. As illustrated in FIG. 9, PEMAX,MR-DC indicating a maximum transmit power defined during MR-DC (Multi RAT DC) is signaled to the user equipment 200 via a higher layer. Note that, instead of MR-DC, EN-DC may be applicable.

As illustrated in FIG. 9, PPowerClass_Default,EN-DC indicating default power class during EN-DC may be power class 3, unless specified configured.

Also, as illustrated in FIG. 9, a maximum transmit power PCMAX is calculated based on PPowerClass_Default,EN-DC indicating default power class during EN-DC, and PEMAX, MR-DC.

As illustrated in FIG. 9, in a case where the user equipment 200 applies to a larger power class than default power class, if PEMAX, MR-DC is not indicated, or is indicated so that it belongs to a power class that is equal to or smaller than the default power class, ΔPPowerClass,EN-DC is defined by PPowerClass,EN-DC-PPowerClass_Default,EN-DC. Otherwise, ΔPPowerClass,EN-DC is 0.

In the embodiment described above, the base station apparatus 100 and the user equipment 200 are capable of indicating, as the UE capability, the default power class or the power class as well as the spherical coverage, which are associated with the frequency band and the terminal type, to the base station apparatus 100. Also, the base station apparatus 100 and the user equipment 200 are capable of performing transmit power control based on the default power class or the power class as well as the spherical coverage class. In addition, the base station apparatus 100 and the user equipment 200 are capable of defining the maximum transmit power for EN-DC based on the maximum transmit power of each RAT in LTE or NR.

That is, the user equipment is capable of properly performing transmit power control in the wireless communication system.

Device Configuration

Next, explanation will be provided for functional configurations of the base station apparatus 100 and user equipment 200, which execute the processing and operation described above. The base station apparatus 100 and the user equipment 200 include at least functions for implementing the embodiment example. However, the base station apparatus 100 and the user equipment 200 may respectively comprise a portion of the functions described in the embodiment.

Figure 10:
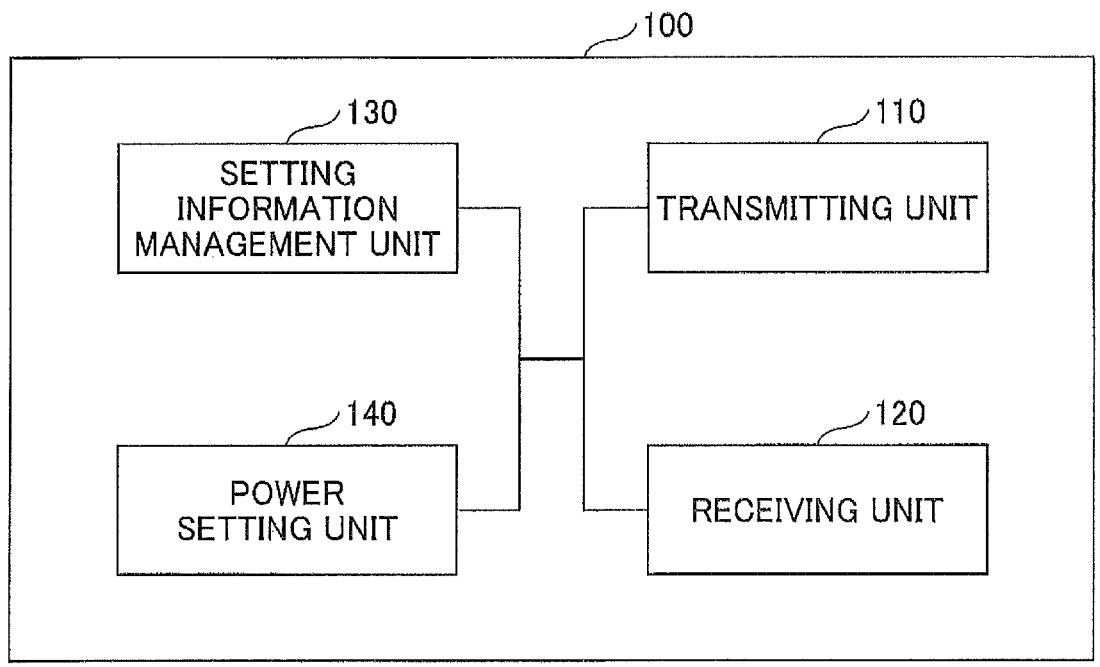
FIG. 10 is a diagram illustrating an example of a functional configuration of a base station apparatus 100 according to the embodiment of the present invention.

FIG. 10 is a diagram illustrating an example of a functional configuration of the base station apparatus 100. As illustrated in FIG. 10, the base station apparatus 100 has a transmitting unit 110, a receiving unit 120, a setting information management unit 130, and a power setting unit 140. The functional configuration illustrated in FIG. 10 is merely an example. Any name may be used for functional sections and functional units as long as the operation according to the embodiment of the present invention can be executed.

The transmitting unit 110 includes a function of generating signals to be transmitted to the user equipment 200 to transmit the signals by wireless. The receiving unit 120 includes a function of receiving various types of signal to obtain, for example, information on a higher layer from the received signal. Also, the receiving unit 120 demodulates NR-PUSCH based on PT-RS received from the user equipment 200. The transmitting unit 110 has a function of transmitting NR-PSS, NR-SSS, NR-PBCH, NR-PDCCH, NR-PDSCH, or so forth to the user equipment 200. Further, the transmitting unit 110 transmits various types of reference signal, e.g., DM-RS to the user equipment 200.

The setting information management unit 130 stores preset setting information, and various types of setting information to be transmitted to the user equipment 200. The content of the setting information is, for example, information on transmit power control of the user equipment 200, or so forth.

As described in the embodiment example, the power setting unit 140 transmits information on power control from the base station apparatus 100 to the user equipment 200. It is noted that the transmitting unit 110 may include a functional unit relating to the transmission of signals to the user equipment 200, which is available to the power setting unit 140. Alternatively, the receiving unit 120 may include a functional unit relating to the reception of signals from the user equipment 200, which is available to the power setting unit 140.

Figure 11:
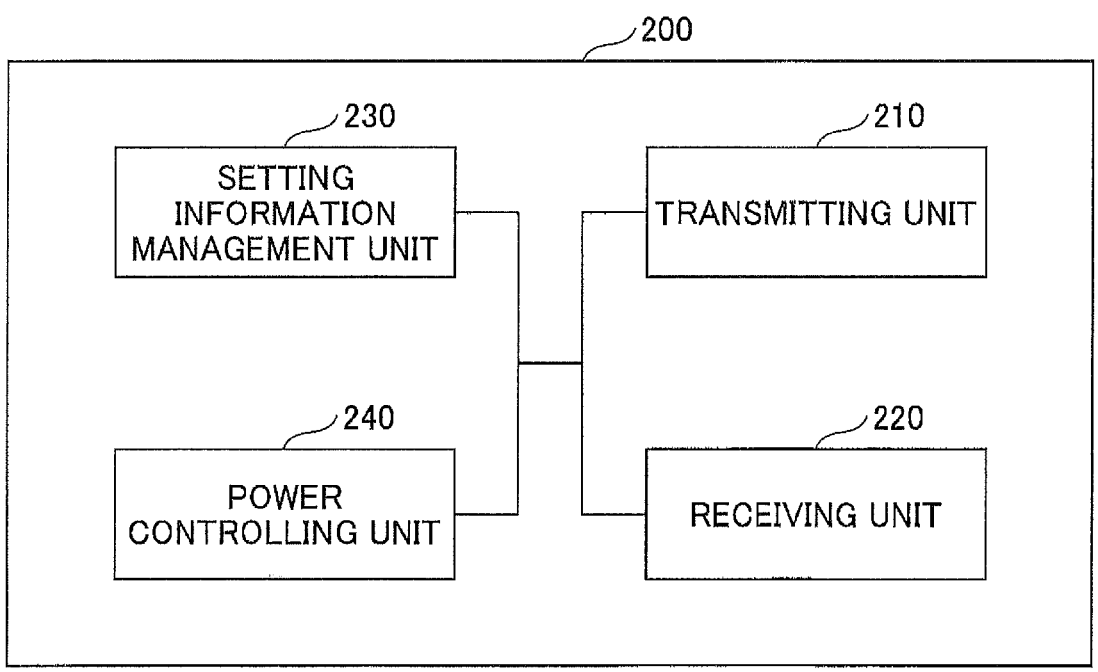
FIG. 11 is a diagram illustrating an example of a functional configuration of user equipment 200 according to the embodiment of the present invention.

FIG. 11 is a diagram illustrating an example of a functional configuration of the user equipment 200. As illustrated in FIG. 11, the user equipment 200 has a transmitting unit 210, a receiving unit 220, a setting information management unit 230, and a power controlling unit 240. The functional configuration illustrated in FIG. 11 is merely an example. Any name may be used for functional sections and functional units as long as the operation according to the embodiment of the present invention can be executed.

The transmitting unit 210 generates a transmission signal from transmission data to transmit the transmission signal by wireless. The transmitting unit 210 transmits signals including various types of reference signal, e.g., PT-RS, and NR-PUSCH corresponding to PT-RS, to the base station apparatus 100. The receiving unit 220 wirelessly receives various types of signal to obtain a higher-layer signal from a received physical-layer signal. Also, the receiving unit 220 has a function of receiving NR-PSS, NR-SSS, NR-PBCH, NR-PDCCH, NR-PDSCH, or so forth that are transmitted by the base station apparatus 100. Further, the transmitting unit 210 transmits an uplink signal to the base station apparatus 100, and the receiving unit 220 receives various types of reference signal, e.g., DM-RS, PT-RS, or so forth from the base station apparatus 100. The setting information management unit 230 stores information a various types of setting information received from the base station apparatus 100 via the receiving unit 220. Also, the setting information management unit 230 stores preconfigured setting information. The content of the setting information is, for example, information on transmit power control of the user equipment 200, or so forth.

The power controlling unit 240, as described in the embodiment example, transmits UE capability related to transmit power to the base station apparatus 100. Also, the power controlling unit 240 performs transmit power control based on the information related to power control received from the base station apparatus 100. It is noted that the transmitting unit 210 may include a functional unit relating to the transmission of signals to the base station apparatus 100, which is available to the power controlling unit 240. Alternatively, the receiving unit 220 may include a functional unit relating to the reception of signals from the base station apparatus 100, which is available to the power controlling unit 240.

Hardware Configuration

The above diagrams (FIG. 10 and FIG. 11) illustrating the functional configurations used in the embodiment of the present invention indicate blocks per functional unit. These functional blocks (configuration units) are implemented by any combination of hardware and/or software. Also, means for implementing these functional blocks is not particularly limited. That is, each functional block may be implemented by one device in which multiple components are physically and/or logically coupled, or be implemented by two or more devices that are physically and/or logically separated from each other and are connected directly and/or indirectly (for example, in a wired manner and/or wirelessly).

Figure 12:
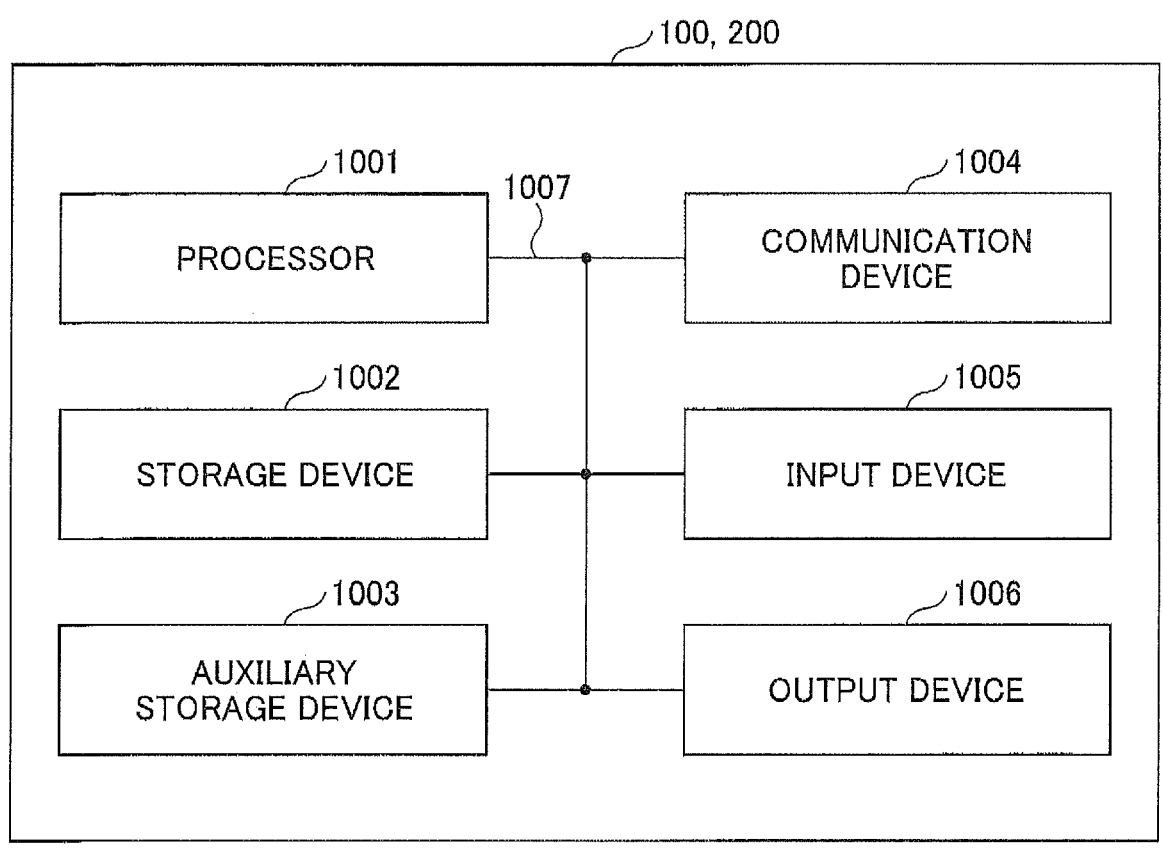
FIG. 12 is a diagram illustrating an example of a hardware configuration of the base station apparatus 100 or the user equipment 200 according to the embodiment of the present invention.

For example, the base station apparatus 100 and the user equipment 200 according to one embodiment of the present invention may function as a computer that performs processing according to the embodiment of the present invention. FIG. 12 is a block diagram illustrating an example of the hardware configuration of a wireless communication device that is the base station apparatus 100 or the user equipment 200 according to the embodiment of the present invention. Each of the above base station apparatus 100 and user equipment 200 may be physically configured as a computer device including, a processor 1001, a storage device 1002, an auxiliary storage device 1003, a communication device 1004, an input device 1005, an output device 1006, a bus 1007, and so forth.

It is noted that, in the following description, the term "device" can be replaced with a circuit, an apparatus, a unit, or so forth. The hardware configurations of the base station apparatus 100 and the user equipment 200 may include one or more of the respective devices that are represented by 1001 through 1006 of the figure, or may not include a part of the devices.

Each function of the base station apparatus 100 and the user equipment 200 may be implemented by the following processes: a predetermined software (program) is read onto hardware such as the processor 1001 or the storage device 1002 and the processor 1001 performs operation, and controls communication by the communication device 1004, and the reading and/or writing of data in the storage device 1002 and the auxiliary storage device 1003.

The processor 1001 runs, for example, an operating system to control the overall operation of the computer. The processor 1001 may be a central processing unit (CPU) including an interface with peripheral device, a control device, an arithmetic device, a register and so forth.

The processor 1001 reads a program (program code), a software module, or data from the auxiliary storage device 1003 and/or the communication device 1004 to the storage device 1002, and performs various types of process according to the program, the software module, or the data. A program that causes the computer to perform at least some of the operations described in the embodiment is used as the program. For example, the transmitting unit 110, the receiving unit 120, the setting information management unit 130, and the power setting unit 140 of the base station apparatus 100, as illustrated in FIG. 10, are stored in the storage device 1002, and these may be implemented by a control program executed by the processor 1001. Also, for example, the transmitting unit 210, the receiving unit 220, the setting information management unit 230, and the power controlling unit 240 of the user equipment 200, as illustrated in FIG. 11, are stored in the storage device 1002, and these may be implemented by a control program executed by the processor 1001. Explanation has been provided above for the case that the above various processes are performed by one processor 1001. However, such processes may be simultaneously or sequentially performed by two or more processors 1001. The processor 1001 may be mounted with one or more chips. It is noted that the program may be transmitted from the network through an electric communication line.

The storage device 1002 is a computer-readable recording medium and may include at least one of, for example, a ROM (Read Only Memory), an EPROM (Erasable Programmable ROM), an EEPROM (Electrically Erasable Programmable ROM), a RAM (Random Access Memory), and so forth. The storage device 1002 may be also referred to as a register, a cache, a main memory (main storage device), or so forth. The storage device 1002 can store a program (program code), a software module and so forth that can be executed to perform the processes according to one embodiment of the present invention.

The auxiliary storage device 1003 is a computer-readable recording medium and may be at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and so forth. The auxiliary storage device 1003 may be referred to as an auxiliary storage device. The above storage medium may be, for example, a database including the storage device 1002 and/or the auxiliary storage device 1003, a server, and other proper media.

The communication device 1004 is hardware (transmission and reception device) for communicating with the computer through a wired and/or wireless network and is also referred to as, for example, a network device, a network controller, a network card, a communication module, or so forth. For example, the transmitting unit 110 and the receiving unit 120 of the base station apparatus 100 may be implemented by the communication device 1004. Also, the transmitting unit 210 and the receiving unit 220 of the user equipment 200 may be implemented by the communication device 1004.

The input device 1005 is an input device (for example, a keyboard, a mouse, a microphone, a switch, a button, a sensor or so forth) that receives an input from the outside. The output device 1006 is an output device (for example, a display, a speaker, an LED lamp or so forth) that performs an output to the outside. It is noted that the input device 1005 and the output device 1006 may be integrated with each other (for example, a touch panel).

All devices, such as the processor 1001 and the storage device 1002, are connected to each other via a bus 1007 for information communication. The bus 1007 may be a single bus, or such devices may be connected to each other via different buses.

The base station apparatus 100 and the user equipment 200 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be mounted with at least one of these hardware components.

Conclusion of the Embodiments

As described above, according to the embodiment of the present invention, user equipment is provided: having a controlling unit that determines UE capability related to transmit power, the UE capability including information indicating a power class and spherical coverage; a notification unit that transmits the determined UE capability to a base station apparatus; a receiving unit that receives, from the base station apparatus, information on power control based on the transmitted UE capability; and a transmitting unit that transmits an uplink transmission signal, to which transmit power control based on the information on power control is applied, to the base station apparatus.

In such a configuration, the user equipment 200 can perform transmit power control based on the power class and the spherical coverage, by indicating the UE capability that includes the information indicating the power class and spherical coverage to the base station apparatus 100. That is, the user equipment is capable of properly performing transmit power control in a wireless communication system.

The UE capability includes, for each of supported frequency bands, information indicating a frequency band, information indicating a type of the user equipment, and information indicating additional power class and spherical coverage other than predetermined default power class and spherical coverage, and the power class may be defined with a maximum transmit power value or a minimum peak EIRP (Equivalent Isotropic Radiated Power) value. In such a configuration, the user equipment 200 is capable of indicating the power class defined with the maximum transmit power value or the minimum peak EIRP to the base station apparatus 100, along with including, as the UE capability, the default power class or the power class as well as the spherical coverage, which are associated with the frequency band and a terminal type.

For each of power classes, or independently of the power class, the spherical coverage may be defined according to a spherical coverage class that is defined based on: an EIRP value and a CDF (Cumulative Distribution Function) value; an EIRP value and a predetermined range of CDF values; or a predetermined range of EIRP values and a CDF value. In such a configuration, the user equipment 200 is capable of performing transmit power control based on the spherical coverage supported for each frequency band or power class.

For each band combination in which a frequency band of a first RAT (Radio Access Technology) and multiple frequency bands of a second RAT are configured, the UE capability may include, as a power class of the band combination, the following: a sum of a power class corresponding to the frequency band of the first RAT and power classes corresponding to the multiple frequency bands of the second RAT, the larger of a power class corresponding to the frequency band of the first RAT or power classes corresponding to the multiple frequency bands of the second RAT, or the smaller of a power class corresponding to the frequency band of the first RAT or power classes corresponding to the multiple frequency bands of the second RAT. In such a configuration, the user equipment 200 is capable of determining the power class of the band combination with use during EN-DC according to desirable transmit power control.

A maximum transmit power for use in communicating with the band combination may be calculated based on the power class of the band combination, and a maximum transmit power allowed in a group of cells of the first RAT and the second RAT that are connected when communication is performed with the band combination. In such a configuration, with respect to the band combination during EN-DC, the user equipment 200 is capable of properly calculating the maximum transmit power based on the maximum transmit power of each RAT in LTE or NR.

Furthermore, according to the embodiment of the present invention, a base station apparatus is provided; having an acquisition unit that receives UE capability from user equipment, the UE capability including information indicating a power class and spherical coverage for each of frequencies supported by the user equipment; a setting unit that determines information on power control based on the received UE capability; a transmitting unit that transmits the determined information on power control to the user equipment; and a receiving unit that receives, from the user equipment, an uplink transmission signal to which transmit power control calculated based on the information on power control is applied.

In such a configuration, the base station apparatus 100 is capable of performing transmit power control based on the power class and spherical coverage, by receiving the UE capability that includes the information indicating the power class and spherical coverage from the user equipment 200. That is, the user equipment is capable of properly performing transmit power control in the wireless communication system.

Supplemental Embodiments

The embodiments of the present invention have been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for description, but the numerical values are merely examples, and any suitable values may be used unless otherwise stated. The classification of items in the above description is not essential to the present invention, matters described in two or more items may be combined and used as necessary, and a matter described in one item may be applied to a matter described in another item (unless there is a contradiction). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the processing procedures described in the embodiment, the order of processes may be changed as long as there is no inconsistency. For the sake of convenience of description, the base station apparatus 100 and the user equipment 200 have been described using the functional block diagrams, but such equipment may be implemented by hardware, software, or a combination thereof. The software executed by the processor of the base station apparatus 100 according to the embodiment of the present invention, and the software executed by the processor of the user equipment 200 according to the embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

The notification of information is not limited to the aspect/embodiment described in the specification, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also referred to as an RRC message and may be, for example, an RRC connection setup message, an RRC connection reconfiguration message or so forth.

Each aspect/embodiment described in the specification may be applied to systems using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide-Band), Bluetooth (registered trademark), and other proper systems, and/or next-generation systems that are extended base on these systems.

In each aspect/embodiment described in the specification, the order of the processes in the procedure, the sequence, the flowchart and so forth may be changed as long as there is no contraction therebetween. For example, for the method described in the specification, elements of various steps are presented in the illustrative order and are not limited to the presented specific order.

In the specification, in some cases, the specific operation performed by the base station apparatus 100 may be performed by an upper node of the base station apparatus. In a network provided with one or more network nodes having the base station apparatus 100, it is apparent that various operations performed for communication with the user equipment 200 can be performed by another network node (for example, MME or S-GW is considered, but such a network node is not limited thereto) excluding the base station apparatus 100 and/or the user equipment 200. In the aforementioned example, one network node is provided other than the base station apparatus 100. However, a plurality of other network nodes (for example, MME and S-GW) may be combined with each other.

Each aspect/embodiment described in the specification may be used individually or in combination, or be switched according to the implementation thereof.

In some cases, the user equipment 200 is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other proper terms by those skilled in the art.

In some cases, the base station apparatus 100 is referred to as NB (NodeB), eNB (evolved NodeB), gNB, a base station, or other proper terms by those skilled in the art.

In some cases, the terms "determining" and "determining" used in the specification include various operations. The terms "determining" and "deciding" may include "determination" and "decision", etc. for, e.g., judging, calculating, computing, processing, deriving, investigating, looking up (for example, search in a table, a database or other data structures), and ascertaining operations. Also, the terms "determining" and "deciding" may include "determination" and "decision", etc. for receiving (for example, receiving information), transmitting (for example, transmitting information), input, output, and accessing (for example, accessing data in a memory) operations. Further, the terms "determining" and "deciding" may include "determination" and "decision" for resolving, selecting, choosing, establishing, and comparing operations, etc. That is, the terms "determining" and "deciding" may include "determination" and "decision" for any operation.

The term "based on" used in the specification does not mean "based on only" unless otherwise stated. In other words, the term "based on" means both "based on only" and "based on at least".

The terms "include" and "including" and the modifications thereof are intended to be inclusive, similarly to the term "comprising", as long as they are used in the specification or the claims. In addition, the term "or" used in the specification or the claims is not intended to mean exclusive OR.

The articles, e.g., "a", "an", and "the" given in the present disclosure as a whole in an English translation may include two or more unless such a plural form clearly departs from the context of the present disclosure.

It is noted that the power controlling unit 240 is an example of a controlling unit. The power setting unit 140 is an example of a setting unit. The transmitting unit 210 is an example of a notification unit or a transmitting unit. The receiving unit 120 is an example of an acquisition unit or a receiving unit. "Band number" is an example of information indicating a frequency band. "UE types" is an example of information indicating a type of user equipment. LTE is an example of a first RAT. NR is an example of a second RAT.

The present invention has been described above. It will be apparent to those skilled in the art that the present invention is not limited to the embodiment described in the specification. Various modifications and changes of the present invention can be made without departing from the spirit and scope of the present invention which are defined by the claims. Therefore, the specification is illustrative and does not limit the present invention.

LIST OF REFERENCE SYMBOLS

100 BASE STATION APPARATUS
200 USER EQUIPMENT

110 TRANSMITTING UNIT
120 RECEIVING UNIT
130 SETTING INFORMATION MANAGEMENT UNIT
140 POWER SETTING UNIT
200 USER EQUIPMENT
210 TRANSMITTING UNIT
220 RECEIVING UNIT
230 SETTING INFORMATION MANAGEMENT UNIT
240 POWER CONTROLLING UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a transmitter that transmits, to a base station apparatus, UE capability including information indicating a supported frequency band and information indicating a power class and spherical coverage in the frequency band; and
a receiver that receives, from the base station apparatus, information on power control,
wherein the transmitter further transmits, to the base station apparatus, an uplink transmission signal to which transmit power control based on at least one of the information on power control or the power class is applied, and
wherein the spherical coverage is defined by an Equivalent Isotropic Radiated Power (EIRP) value at a given percentile value of a Cumulative Distribution Function (CDF) representing spherically radiated power.

2. The terminal according to claim 1, wherein, for each of supported frequency bands, the power class further defines at least one of a minimum peak EIRP (Equivalent Isotropic Radiated Power) value, a maximum allowed EIRP value and a maximum transmit power value.

3. A base station apparatus comprising:
a receiver that receives, from a terminal, UE capability including information indicating a frequency band supported by the terminal and information indicating a power class and spherical coverage in the frequency band; and
a transmitter that transmits, to the terminal, information on power control,
wherein the receiver further receives, from the terminal, an uplink transmission signal to which transmit power control based on at least one of the information on power control or the power class is applied, and
wherein the spherical coverage is defined by an Equivalent Isotropic Radiated Power (EIRP) value at a given percentile value of a Cumulative Distribution Function (CDF) representing spherically radiated power.

4. A communication method performed by a terminal, the method comprising:
transmitting, to a base station apparatus, UE capability including information indicating a supported frequency band and information indicating a power class and spherical coverage in the frequency band;
receiving, from the base station apparatus, information on power control; and
transmitting, to the base station apparatus, an uplink transmission signal to which transmit power control based on at least one of the information on power control or the power class is applied,
wherein the spherical coverage is defined by an Equivalent Isotropic Radiated Power (EIRP) value at a given percentile value of a Cumulative Distribution Function (CDF) representing spherically radiated power.

* * * * *